Patented Jan. 12, 1932

1,840,932

UNITED STATES PATENT OFFICE

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT

TREATMENT OF RUBBER

No Drawing.   Application filed July 2, 1929.   Serial No. 375,577.

This invention relates to the vulcanization of rubber and similar vulcanizable materials, and more particularly to the provision and use in rubber of a new accelerator of vulcanization. It also relates to the product of such treatment. It also relates to the accelerator as a new chemical and the process of making it.

It has been found that the material resulting from the methylation of the mixture of aliphatic bases prepared by reacting an ethylene dihalide with ammonia, and designated polyethylene polyamine, has excellent accelerating properties. The material is of indefinite chemical formula and for the sake of simplicity is referred to as methylated polyethylene polyamine. The accelerator functions well in the absence of zinc oxide and remarkably well in the presence of from 1 to 3 parts of zinc oxide in tread stocks containing at least 30 parts of carbon black per 100 parts of rubber.

The new accelerator is preferably prepared from polyethylene polyamine made as follows:

350 lbs. of ethylene dichloride and 510 lbs. of aqua-ammonia (26° Bé.) are introduced into an autoclave equipped with heating and cooling coils. Steam under pressure of 30 lbs. per square inch is run into the heating coils until the internal pressure has reached 100 lbs. per square inch. The pressure of the steam in the coils continues to rise until a pressure of 155 lbs. is reached. The internal pressure is now maintained at from 140 to 150 lbs. per square inch for one hour. Either steam or cold water may be run into the coils during the period as required. After one hour the internal pressure is allowed to drop to 120 lbs. Steam at 70 lbs. pressure is then introduced into the coils and the internal pressure is maintained for another hour at 120 to 130 lbs. The reaction is now complete.

The charge is transferred to a crystallizing tank equipped with cooling coils. Two hours are required for the cooling. Precipitated ammonium chloride and iron hydroxide are then removed by filtration. Then 350 lbs. of aqueous 75% caustic solution are added to the batch, which is then heated in order to decompose the amine hydrochlorides and the ammonium chloride remaining in solution, and to drive out the ammonia. The ammonia vapors may be recovered.

The solution is then transferred to a settling tank and allowed to stand for 16 hours. At the end of this time the liquid has separated into two layers, the upper layer consisting of an aqueous solution of polyethylene polyamine and the lower layer consisting of a mixture of concentrated caustic solution and suspended sodium chloride. The oily upper layer is separated and further dehydrated by treating with 10% of its weight of solid flake caustic. The yield of dehydrated polyethylene polyamine so obtained is about 100 lbs.

100 grams of the polyethylene polyamine are dissolved in water and the solution is made acid by adding aqueous hydrochloric acid. The solution is evaporated to dryness and the resulting product is transferred to an appropriate container, and 100 c. c. of 37% formaldehyde is added. This is heated in an oil bath under a reflux condenser for one hour, then another 100 c. c. of formaldehyde is added. The temperature of the oil bath ranges from 130 to 160° C. The temperature of the refluxing solution varies from 95 to 105° C. The total heating lasts for a period of about 14 hours. The solution is then cooled and the methylated amine is thrown out by the addition of solid sodium or potassium hydroxide. The methylated amine may be dehydrated further by heating with solid potassium or sodium hydroxide. The heating is done in an oil bath under a reflux condenser. The temperature of the oil bath reaches a maximum of 135° C. The separated material is a dark brown liquid soluble in water, yielding a strongly basic solution. The amount of formaldehyde used to treat the polyethylene polyamine hydrochloride may be varied according to the degree of methylation desired and it is to be understood the invention is not limited to the amounts of formaldehyde described in the example.

An illustrative embodiment of the invention in connection with the vulcanization of rubber is given as follows:—

*Example 1.*—100 parts of smoked sheet rubber, 50 parts of carbon black, 2 parts of zinc oxide, 5 parts pine tar, 1 part palm oil, 3.5 parts sulphur, and 1.25 parts of methylated polyethylene polyamine are mixed on the mill in the usual manner. This is vulcanized in a mold under 45 pounds steam pressure for 60 minutes, and is found to give good tensile, excellent resistance to abrasion and normal ageing. Test data as compared with that of a standard tread stock using a mixture of diphenyl guanidine and hexamethylene tetramine as the accelerator is given below:

|  | Methylated polyethylene polyamine | Hexa-DPG |
| --- | --- | --- |
| Tensile strength before ageing | 4090 | 4145 |
| Tensile after ageing 168 hrs. in oxygen | 1235 | 1260 |
| Resistance to abrasion (relative wear) | 195 | 121 |

The invention may be applied in the cure of translucent crepe soles, pure gum bicycle tires, tire covers, pneumatic tires, etc.

With the detailed disclosure above given, it is obvious that modifications will suggest themselves without departing from the principle of the invention. For instance in using the methylated amine in the treatment of rubber it may be mixed with any desirable amount of inert material such as stearic acid,—and it is not desired to limit the invention otherwise than as set forth in the appended claims.

Having thus described my invention, what I claim and desire to protect by Letters Patent is:

1. A method of treating rubber which comprises incorporating with rubber methylated polyethylene polyamine.

2. A method of treating rubber which comprises incorporating with rubber methylated polyethylene polyamine and subsequently vulcanizing the rubber.

3. A method of treating rubber which comprises incorporating with a rubber stock a methylated amine resulting from the reaction of formaldehyde and polyethylene polyamine in an inorganic acid medium.

4. A method of treating rubber which comprises vulcanizing rubber in the presence of a methylated amine resulting from the reaction in an inorganic acid medium of formaldehyde and polyethylene polyamine.

5. A rubber product derived from rubber treated with a methylated amine resulting from the reaction in an inorganic acid medium of formaldehyde and polyethylene polyamine.

6. A rubber product derived from rubber treated with methylated polyethylene polyamine.

7. A vulcanized rubber product derived from rubber treated with a methylated amine resulting from the reaction of formaldehyde and polyethylene polyamine in an inorganic acid medium.

8. A vulcanized rubber product derived from rubber treated with methylated polyethylene polyamine.

Signed at Passaic, county of Passaic, State of New Jersey, this 26th day of June, 1929.

SIDNEY M. CADWELL.